Sept. 14, 1937.                    H. H. DAVIES                    2,093,035
                              PRESSURE REGULATING VALVE
                                 Filed Dec. 17, 1935

Inventor
Holden H. Davies
by Hazard and Miller
Attorneys.

Patented Sept. 14, 1937

2,093,035

UNITED STATES PATENT OFFICE 2,093,035

PRESSURE REGULATING VALVE

Holden H. Davies, Pasadena, Calif.

Application December 17, 1935, Serial No. 54,839

6 Claims. (Cl. 137—53)

My invention relates to a pressure regulating valve particularly adapted for regulating the pressure of a fluid transmitted through pipes or conduits.

An object and feature of my invention is a pressure regulating valve whereby a valve is operated by a flowing liquid and when the pressure of the liquid becomes excessive the valve is lifted and thus opening, allowing an overflow.

A further object and feature of my invention is the construction of a simple type of pressure regulator by which rubber hose or flexible rubber conduits may be connected to the valve having a lift plunger, whereby water flowing through one or more conduits and discharging through another conduit may regulate the pressure in the outlet, the valve plunger lifting and allowing an overflow when the pressure becomes excessive either through increase of pressure in the supply or increased resistance to flow in the outlet.

Another and more detailed object of my invention is in a valve having a pedestal with a base whereby the valve may be placed on a flat surface, such valve having a mixing chamber adjacent the base in which the supply and outlet conduits connect. A valve seat is provided above the mixing chamber, there being a tubular pedestal structure above the seat with the weighted valve plunger resting on the seat, the sealing means being preferably a conical lower end on the plunger bearing on a complementary seat, the closure being by the weight of the plunger. In this construction I may have a plurality of supply pipes, for instance, one for hot and one for cold water, such water intermingling in the mixing chamber. The out flow is through a third pipe connected to the mixing chamber and manifestly the pressure in the outlet is governed by the operation of the plunger. Should the pressure become excessive above a predetermined amount either through increase of pressure in the supply or restriction of the outlet, the valve plunger lifts and allows discharge of the fluid through the tubular pedestal.

A general object of my invention is thus a valve for delivering fluid at any temperature below a predetermined maximum pressure, but instead of causing a shutoff from the source of supply, the surplus fluid is allowed to discharge by overflow. The valve preferably has a mixing chamber wherein hot and cold water may be mixed to the desired temperature. It will be understood that spaces are provided between the main portion of the body of the plunger and the inside wall of the pedestal for free flow of the overflow excess fluid.

My invention is illustrated in the accompanying drawing, in which.

Figure 1:
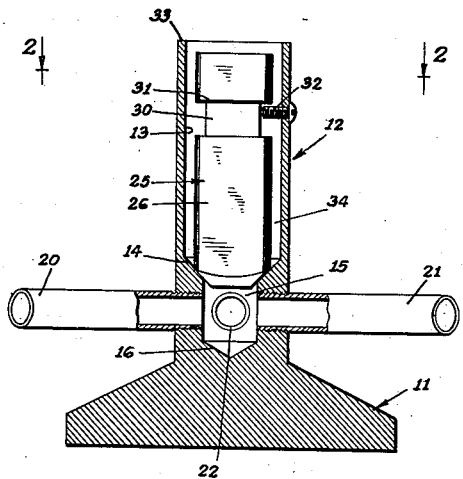
Fig. 1 is a vertical section through the valve showing, however, intake or supply pipes in a broken section.
Figure 3:
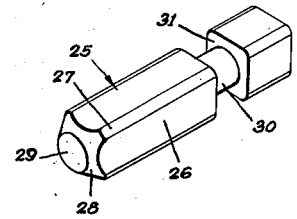
Fig. 3 is a perspective view of the valve plug.
Figure 2:
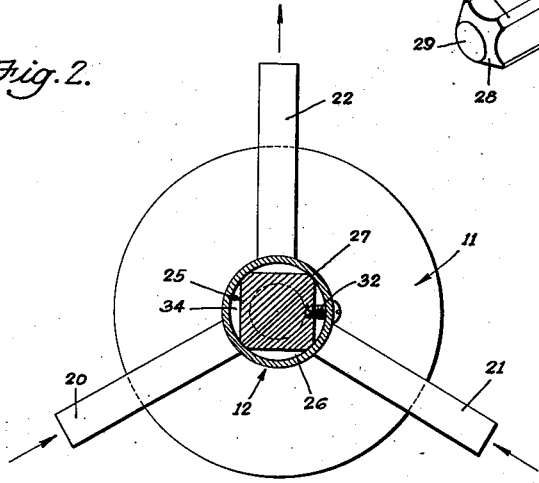
Fig. 2 is a horizontal section on the line 2—2 of Fig. 1 in the direction of the arrows.

In my invention I employ a substantial base 11 from which extends a hollow pedestal 12, this being illustrated as cylindrical both on the inside and outside, thus providing an overflow chamber 13 at the upper portion, an annular sloping valve seat 14, a cylindrical mixing chamber 15 below the valve seat, the mixing chamber terminating at 16.

In the form of my invention shown I have two supply pipes 20 and 21 which extend through the lower or pipe portion of the pedestal above the base and communicate with the mixing chamber 15. There is also an outlet pipe 22 likewise connected to the mixing chamber, this provides for a flow of water through the two supply pipes, one of which may be connected to a hot water faucet and the other to a cold, so that the water may be mixed at a desired temperature and have an outflow at the temperature desired.

The valve plug designated 25 has its main body of stock square in cross section, thus having flat sides 26 and of such a size that the cylindrically rounded corners 27 form a surface bearing on the inside cylindrical surface 13 and thus form guides for the vertical movement of the plug. The plug has a seating end 28 which is formed of a frustrum of a cone with the apex of the plug 29 downwardly, this being adapted to seat and form a closure on the sloping seat 14. In order to limit the movement of the valve plug I have a neck structure 30 formed by cutting away the corners of the square portion of the plug, leaving the neck cylindrical and thus providing shoulders 31 above and below the neck, which shoulders may be engaged by a set screw 32 threaded through the upper portion of the pedestal. There are vertical spaces 34 between the body of the plug and pedestal for upward flow of surplus fluid.

With my invention, the pipes 20, 21 and 22 are of such a character that flexible rubber conduits may be connected thereto. Therefore the overflow device may be placed in a wash basin or in the bottom of a bath and connected to hot and cold water faucets which, when turned on, cause mixing of the water at the desired temperature. The weight of the valve plug is designed to remain closed for a normal flow of water through the outlet pipe 22, which pipe may be connected to a syringe or any other similar device. Therefore, if the resistance to flow through the outlet pipe is increased the water pressure increases and thus causes a lifting of the valve plug and an overflow over the upper end 33 of the tubular pedestal structure. Likewise, if the pressure in the inlet or supply pipes increases to such an extent that the water cannot be carried off by the outflow pipe, the valve plug will lift and allow an overflow. The set screw 32, as above mentioned, limits the upward movement of the valve plug.

From the above description it will be apparent that my valve is not intended to develop a high pressure in the outflow of fluid, but manifestly this would depend on the size and weight of the plunger of the valve, as the greater the weight of this plunger the greater the fluid pressure required to unseat the same.

Various changes may be made in the principles of my invention without departing from the spirit thereof as defined by the appended claims.

I claim:

1. A pressure regulating valve having in combination, a base flat on the bottom adapted to rest on a flat surface, a pedestal extending above the base and having a cylindrical mixing chamber at the bottom, the lower portion of the pedestal having two inlet passages and one outlet passage communicating with the mixing chamber, the inlet passages being adapted for hot and cold water connection, a conical valve seat above the mixing chamber, an overflow chamber cylindrical on the inside extending upwardly above the valve seat, a valve plug having a complementary conical surface at its lower end to form a closure on the said seat due to the weight only of the plug whereby at normal pressures the entire outflow from the mixing chamber is through the outlet passage, the said plug being adapted to lift and open the valve due to restriction of the outlet passage or increased flow and pressure in the inlet passages.

2. A pressure regulating valve as claimed in claim 1, the side wall of the body of the plug above the seating portion having spaces for the escape of the excess fluid.

3. A pressure regulating valve as claimed in claim 1, the valve plug being substantially square in cross-section above its conical seating end, the corners of the square section forming bearing edges on the inside of the overflow chamber.

4. A pressure regulating valve as claimed in claim 1, the plug above the seating portion at its lower end being substantially square in cross-section except for a reduced neck forming shoulders, the corner edges engaging and forming guides with the cylindrical inside of the overflow chamber, a set screw extending through the pedestal adjacent the reduced neck portion of the plug and adapted to engage the shoulders to limit the movement of the plug.

5. A pressure regulating valve as claimed in claim 1, the plug above the seating portion at its lower end being cylindrical in cross-section except for flat longitudinal faces, the cylindrical surface engaging the inside of the tubular pedestal and the flat faces providing space for the passage of the overflow fluid.

6. A pressure regulating valve having in combination an integral structure comprising a flat base at the bottom adapted to rest on a flat surface and a pedestal extending above the base having in its lower portion a relatively small mixing chamber with two inlet passages, one being adapted for hot and the other for a cold water connection and a third passage forming an outlet for the mixed water, the pedestal having an inverted conical valve seat above the mixing chamber, an overflow chamber above the conical valve seat, said latter chamber being of greater cross-sectional area than the mixing chamber, a valve plug having a complementary conical surface at its lower end to form a closure on the said seat due to the weight only of the plug, an interengaging means between the upper portion of the pedestal and the plug to restrict the upward movement of the plug when unseated, interengaging surfaces between the inside of the overflow chamber and the valve plug to guide the plug in its upward and downward movement, there being spaces between the sides of the plug and the wall of the pedestal adjacent the overflow chamber for the upward flow of water, the upper portion of the pedestal having an opening the full cross-sectional area of the overflow chamber whereby water overflowing may flow downwardly over the pedestal onto the base.

HOLDEN H. DAVIES.